Patented June 30, 1942

2,288,152

UNITED STATES PATENT OFFICE 2,288,152

HECTOGRAPH BLANKET

Johan Bjorksten, Chicago, Ill., assignor to Ditto, Incorporated, Chicago, Ill., a corporation of West Virginia No Drawing. Application May 3, 1941, Serial No. 391,707

7 Claims. (Cl. 41—31.6)

The invention relates to an improvement in hectograph blankets and has for its principal object the provision of a hectograph blanket having a copy mass which is insensitive to atmospheric conditions, including humidity.

Another object is to provide a hectograph blanket which does not require the use of a water soluble dye in the duplicating process.

One embodiment of this invention is a hectograph blanket having a copy mass of a gel whose solid portion essentially comprises a vinyl resin and whose liquid portion is substantially non-hygroscopic.

Among the vinyl resins which may be used in the practice of this invention are the co-polymers of vinyl chloride and vinyl acetate, and the vinyl acetals.

The preferred vinyl resins are those resins having an average molecular weight of between approximately 15,000 and 20,000. Resins of average molecular weight below 10,000 are generally not very desirable or, if used, should be employed in proportions not less than one to one, in which event copy strength is likely to suffer. When the molecular weight exceeds 25,000, difficulties are encountered in bringing the resin to a sufficiently rapid gelation in solvents. Thus although suitable duplication masses could be prepared with vinyl resins when the molecular weight exceeds 25,000, such resins are less desirable to use from a practical manufacturing standpoint.

When co-polymerized vinyl chloride-vinyl acetate resins are employed, it is desirable to have the vinyl acetate proportion below that of the vinyl chloride.

The liquid may be a single liquid compound or a mixture of liquid compounds. It should be a solvent for at least one dye of high tinctorial power such as one of the dyes disclosed in Hoskins Patent 2,088,417, and Brower Patent 2,040,075. Preferably it should be present in greater proportion than the vinyl resin. It should be substantially non-volatile under normal atmospheric conditions. Preferably the liquid is a plasticizer for the vinyl resin. When the copy mass is made by forming a vinyl resin sol and then gelling by a cooling step, the liquid should be a solvent for the vinyl resin at elevated temperature. However, when two or more liquid compounds are used, it is not necessary that all of the liquid compounds be solvents for the vinyl resin.

The following non-hygroscopic liquids have been found suitable: dimethylcellosolve phthalate, phenylcellosolve, methyl-phthalylethylglycollate, and ortho or paratoluene-ethyl sulphonamide. Gelatinous vinyl resin compositions comprising a major proportion of any of these compounds or combinations thereof will be usable for hectograph duplication and, unless non-essential hygroscopic materials are added, will be resistant to humidity.

In preparing the gel copy masses in accordance with this invention, the vinyl resins are heated slowly with a non-hygroscopic plasticizer with agitation. It is highly preferable to use a jacketed heating vessel since contact with overheated walls may cause discoloration and formation of bubbles. Under these conditions, the compositions generally form homogeneous gels in about ten minutes at a temperature of about 200 to 250 degrees F. However, often I found it more convenient to preheat the plasticizer to a temperature of 300 to 350 degrees F. and then to add the resin rapidly with agitation. In either event there results a liquid of viscosity suitable for pouring hectograph pads, which on cooling sets to substantially colorless or brownish gels of fair duplication properties.

To more clearly set forth the practice in accordance with the invention and to more specifically point out the nature of the product and process contemplated thereby, several specific, illustrative examples are hereinafter set forth, it being understood that these examples illustrate several embodiments which have given satisfactory results and are not intended to restrict the invention thereto.

*Example I*

One part by weight of vinyl resin obtained by co-polymerizing 87% of vinyl chloride and 13% vinyl acetate and having a molecular weight of 9000 was agitated slowly in a jacketed container with two parts by weight of methyl phthalyl ethyl glycollate at 220 degrees F. The composition was homogeneous. It was poured onto a backing sheet of porous paper stock. After cooling it was contacted with a printed hectograph master and was then contacted with a number of copy sheets, whereby about twenty legible copies were obtained.

*Example II*

Four parts by weight of para-toluene ethyl sulphonamide were heated to a temperature of 300 degrees F. To this plasticizer were then added one part by weight of a vinyl resin obtained by co-polymerizing 87% vinyl chloride and 13% vinyl acetate and having an average molecular weight of 15,000. The mass was poured at a temperature of 280 degrees F. onto a backing which had been pre-coated with an acetone solution of the same vinyl resin, plasticized by 50% of the weight of the resin of para-toluene ethyl sulphonamide. The composition was allowed to stand overnight, the droplets of plasticizer which had synerized out were removed, and copies were taken as described in Example I.

Example III

Five parts of a vinyl resin having an average molecular weight of 15,000 and a chloride to acetate ratio of 87:13 were intermixed with 25 parts by weight of paratoluene ethyl sulphonamide and 5 parts by weight of methyl phthalyl ethyl glycollate. The composition was heated with agitation in a glycerine bath of 212° F. A homogeneous liquid resulted which, when poured onto a backing, gave a duplication pad which on test was found to have fair duplicating properties and complete humidity resistance.

Example IV

Five parts by weight of a vinyl resin having an average molecular weight of 15,000 and a chloride-acetate ratio of 87 to 13 dissolved with agitation at a temperature of 140° C. in a mixture of octylcellosolve, which is a nonsolvent for the vinyl resin, and a minimum amount of methyl phthalyl ethyl glycollate required to cause complete dissolution of the resin at that temperature. This will be found to be about seven parts by weight of this latter solvent. A preferred procedure is to first heat the octylcellosolve to a temperature of about 140° C., then add the resin with agitation and then to add the methyl phthalyl ethyl glycollate until the composition becomes homogeneous. At this point it is poured onto a backing material, which may be a lacquered cloth. On cooling, a hard, tenacious and mechanically extremely strong, substantially non-tacky mass precipitates which clings to the backing with high tenacity. At the same time a large amount of liquid separates and may be readily poured off and recovered. The composition is allowed to stand over night and may then be subjected to additional pressure for instance by means of squeeze rollers, to remove the remaining amount of free solvent. The composition thus obtained, when contacted with a hectograph master and subsequently with copy sheets, yields a large number of copies of good copy brightness.

In analogous manner, duplication masses were prepared from phenylcellosolve and from dimethyl cellosolve phthalate with these vinyl resins and also with the vinyl resin obtained by copolymerization of 95% vinyl chloride and 5% vinyl acetate and having an average molecular weight of 18,000. Gels suitable for the purpose were also obtained by the use of an acetal resin containing a minor percentage of triethylene glycoldihexoate. While generally following the procedure outlined above, the masses obtained are colorless gels, it may be possible that, under production conditions, the longer heating necessary for dissolving larger quantities may result in some discoloration. It is found that darkening caused by prolonged heating may be counteracted by adding some lead containing materials such as lead chromate, litharge, or the like, and also by adding an organic tin derivative known commercially as D3 or B15 and marketed by the Carbide and Carbon Chemicals Corporation. However, ordinarily the addition of these stabilizers should not be necessary.

To bond masses of this type of backings, the principle which seems to give the best result is to pre-coat the backing with a coating composition obtained by dissolving the resins used in the duplication mass in a volatile solvent and to plasticize with a minor percentage of the plasticizer used in the composition. In some cases it may be necessary to apply several such coatings, in which event each subsequent coating should contain an amount of resin and of plasticizer more closely approximating the composition of the duplication mass than did the amounts of these ingredients in the previous coating.

Obviously, I may find it advantageous to include in the composition other solvents adapted to facilitate or accelerate the dissolution of hectograph dyes; copy brightening agents active by their colloidal properties, such as many glycol esters and the like; pigments, excipients, and other materials known in the art of duplication.

While there have been shown and described certain embodiments of the invention, it is to be understood that it is capable of many modifications. Changes, therefore, may be made without departing from the spirit and scope of the invention as described in the appended claims, in which it is the intention to claim all novelty inherent in the invention as broadly as possible, in view of the prior art.

I claim:

1. A hectograph blanket having a copy mass comprising a vinyl resin gel containing a non-hygroscopic liquid which is a solvent for at least one dye of high tinctorial power, the liquid of said gel being present in greater amount than said vinyl resin and said vinyl resin having a molecular weight of above approximately 10,000.

2. A hectograph blanket characterized by high resistance to humidity, said blanket comprising a copy mass of a vinyl resin gel whose liquid portion is substantially non-hygroscopic and a solvent for at least one dye of high tinctorial power, said vinyl resin having a molecular weight between approximately 10,000 and 25,000 and said liquid being present in greater amount than said vinyl resin.

3. A hectograph blanket characterized by high resistance to humidity, said blanket comprising a copy mass of a vinyl resin gel whose liquid portion is substantially non-hygroscopic, a solvent for at least one dye of high tinctorial power, and a plasticizer for said vinyl resin, said vinyl resin having a molecular weight between approximately 10,000 and 25,000 and said liquid being present in greater amount than said vinyl resin.

4. A hectograph blanket characterized by high resistance to humidity, said blanket comprising a copy mass of a vinyl resin gel whose liquid portion is substantially non-hygroscopic, a solvent for at least one dye of high tinctorial power, a plasticizer for said vinyl resin, and including a solvent for the vinyl resin at elevated temperature and a non-solvent for said vinyl resin, said vinyl resin having a molecular weight between approximately 10,000 and 25,000 and said liquid being present in greater amount than said vinyl resin.

5. A hectograph blanket having a copy mass comprising a vinyl resin and a substantially non-volatile, non-hygroscopic liquid of such character and amount that said vinyl resin will dissolve in said liquid to form a sol at an elevated temperature and form a gel at normal room temperature, said liquid being a solvent for at least one dye of high tinctorial power, said vinyl resin having a molecular weight between approximately 10,000 and 25,000 and said liquid being present in greater amount than said vinyl resin.

6. A hectograph blanket having a copy mass comprising a vinyl resin and a plasticizer; in combination therewith a backing, and an intermediate bonding layer comprising a vinyl resin and a plasticizer, the proportion of plasticizer to vinyl resin in the bonding layer being less than the proportion of plasticizer to vinyl resin in the copy mass.

7. A hectograph blanket having a copy mass of a vinyl resin gel whose liquid portion is a dye solvent and a plasticizer for said vinyl resin present in larger amount than said vinyl resin; in combination therewith a backing, and an intermediate bonding layer comprising a vinyl resin and a plasticizer, the proportion of plasticizer to vinyl resin in the bonding layer being less than the proportion of plasticizer to vinyl resin in the copy mass.

JOHAN BJORKSTEN.